Nov. 14, 1961 L. E. SCHNEITER 3,008,671
MAIN ROTOR AND PYLON FAIRING
Filed Dec. 31, 1956 3 Sheets-Sheet 1

INVENTOR
LESLIE E. SCHNEITER
BY
AGENT

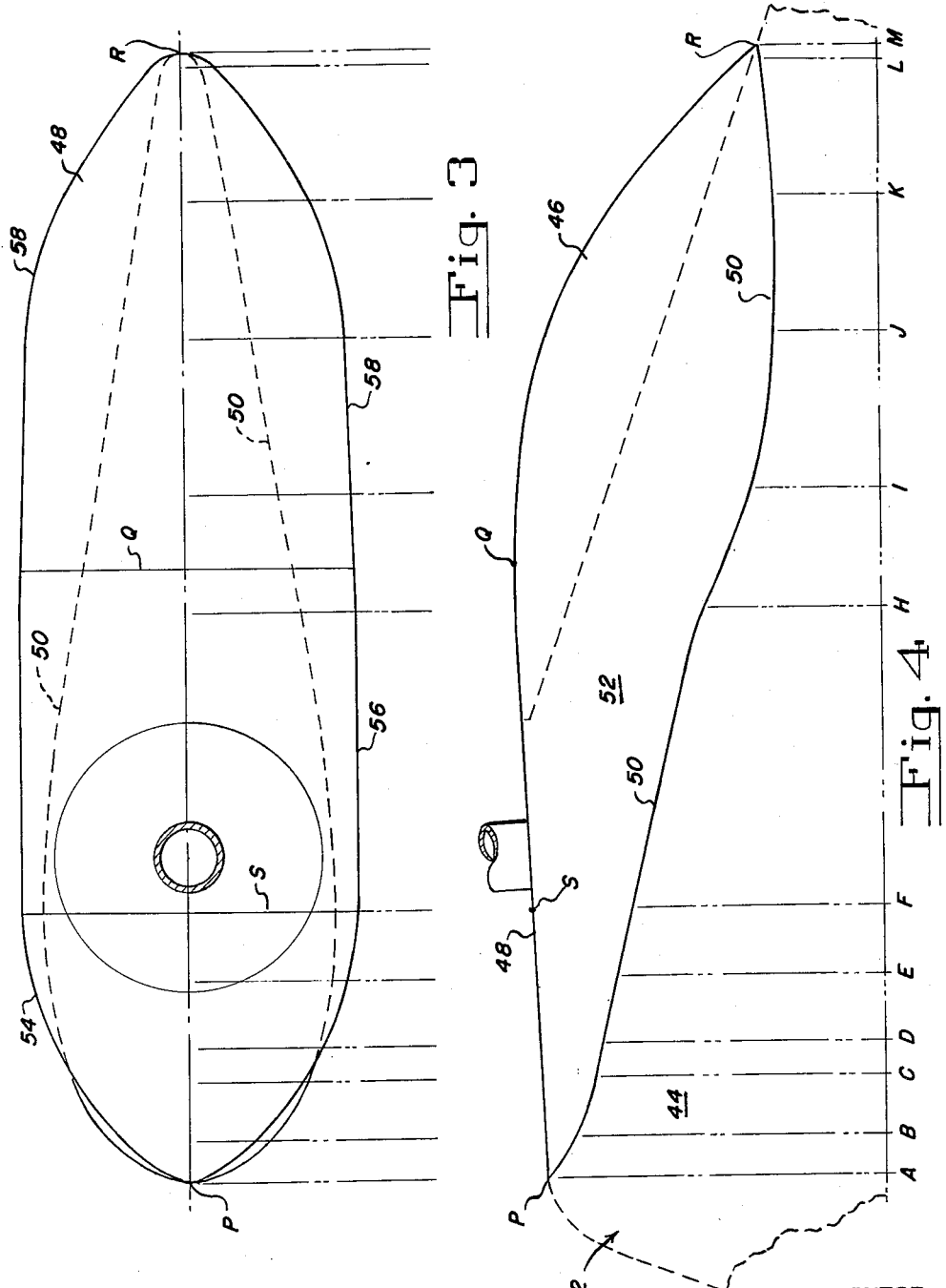

United States Patent Office 3,008,671
Patented Nov. 14, 1961

3,008,671
MAIN ROTOR AND PYLON FAIRING
Leslie E. Schneiter, Devon, Conn., assignor to United Aircraft Corporation, East Hartford, Conn., a corporation of Delaware
Filed Dec. 31, 1956, Ser. No. 631,561
18 Claims. (Cl. 244—17.27)

This invention relates to a rotor and pylon fairing for rotary wing aircraft.

An object of this invention is to provide a device which will reduce the power required to fly a rotary wing aircraft than is presently required for a given craft.

Another object of this invention is to provide means for reducing a random, large amplitude, low frequency lateral shake which occurs in some helicopters.

A further object of this invention is to provide a pumping means for pumping high energy air into a separated regime behind a rotor head.

Another object of this invention is to produce a device which will increase the directional stability of rotary wing aircraft.

A further object of this invention is to provide a device to decrease the turbulent air in which the tail rotor is operating.

Another object of this invention is to provide means for equalizing the forces acting on each blade.

A further object of this invention is to produce a device which will reduce vibratory loads on the blades.

These and other objects and advantages of the invention will be evident or will be pointed out in connection with the following detailed description of the drawings in which an embodiment of the invention is illustrated.

In these drawings:

FIG. 3 is a top view of the pylon fairing.

FIG. 4 is a side view of the pylon fairing.

Figure 1:
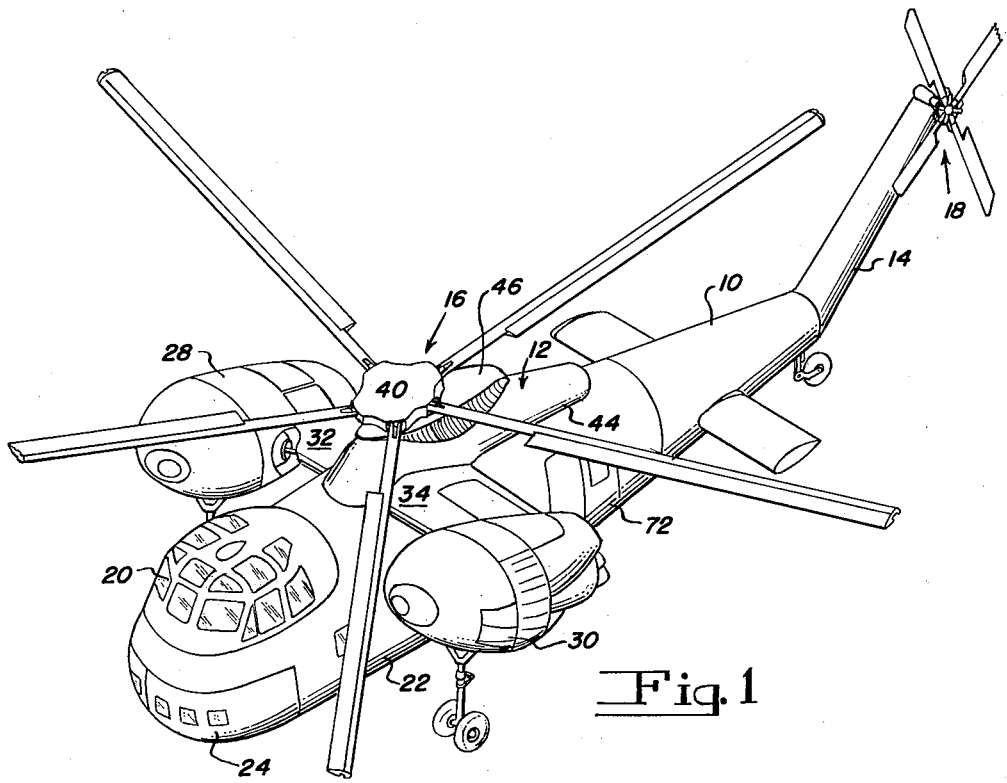
FIG. 1 is a perspective view of a helicopter including the invention.
Figure 2:
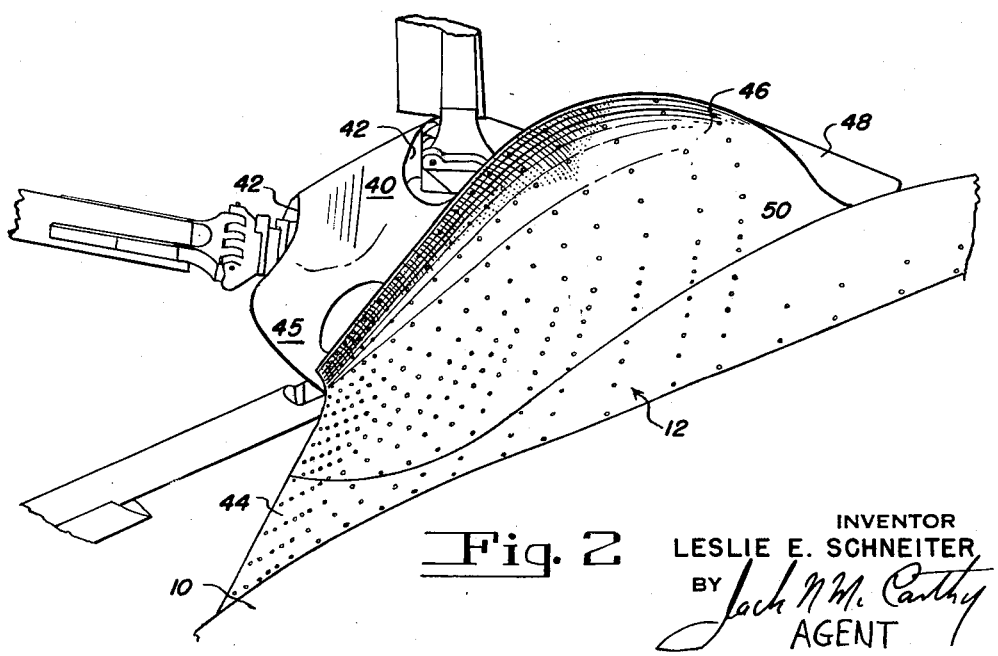
FIG. 2 is an enlarged perspective view of the rotor and pylon fairing.

Referring to FIG. 1, the helicopter shown is of the type described in the United States Patent No. 2,755,038 to Michael E. Gluhareff filed October 21, 1952 for Helicopter-Airplane With Engines Mounted on Fixed Wings. This helicopter comprises essentially an elongated fuselage 10 having a main rotor pylon 12 of streamline shape and a tail rotor pylon 14 on which are mounted the main rotor generally indicated at 16 and a tail rotor generally indicated at 18. The fuselage has a pilot compartment 20 ahead of the main rotor pylon 12 which is located in the upper part of the nose section of the fuselage. The space beneath the pilot compartment extends well aft beneath the main rotor pylon and comprises the main cargo or passenger compartment 22 of the aircraft. Access to the compartment 22 is gained through a pair of clam shell doors 24 in the nose section of the fuselage and a door on the side.

The engines are mounted in engine nacelles 28 and 30 which are carried at the ends of the wings 32 and 34. These wings project laterally from the upper portion of the fuselage in the vicinity of the main rotor pylon.

The main rotor is shown as having five blades of a type which are pivotally connected to the rotor head of the hub which is driven by an upright shaft which extends through the pylon 12 from a gear box.

While a specific aircraft has been shown and described with subject invention, it is to be understood that this aircraft has been used merely as a background for the invention and that the invention is useful on other aircraft.

The rotor head is faired by a metal cover 40 which encloses the rotor head and is provided with openings 42, one for each rotor blade. This metal cover permits complete functioning of the head to control the rotor blades. The bottom of the cover 40 is formed as a flat surface 45 which is normal to the axis of the upright drive shaft.

Rotor pylon 12 includes a bottom section 44 and a fairing 46 of streamline shape having a major upper surface 48. While two sections have been shown, the pylon may be formed of one section having the same or a similar shape. Surface 48 extends from a point P on the pylon, the forwardmost point on said surface (see FIGS. 3 and 4), to a line represented by line Q located rearwardly of the upright drive shaft as a flat surface normal to the axis of the upright drive shaft and parallel to the flat surface 45 of the cover 40. The distance between said surface 48 and surface 45 is made small to maintain the best results when a rotor cover is used. From line Q the surface 48 curves downwardly and inwardly to a point R. From point P to line S the forward edge 54 of surface 48 moves outwardly to a width as shown by line S at a point just forward of the drive shaft. From line S to line Q the side edges 56 of the surface 48 extend parallel to the centerline of the helicopter. The side edges 58 of surface 48 that extend from line Q to point R taper inwardly gradually for approximately one half of the length of this section of surface 48 while the remaining edge tapers inwardly to point R more rapidly.

Figure 5:
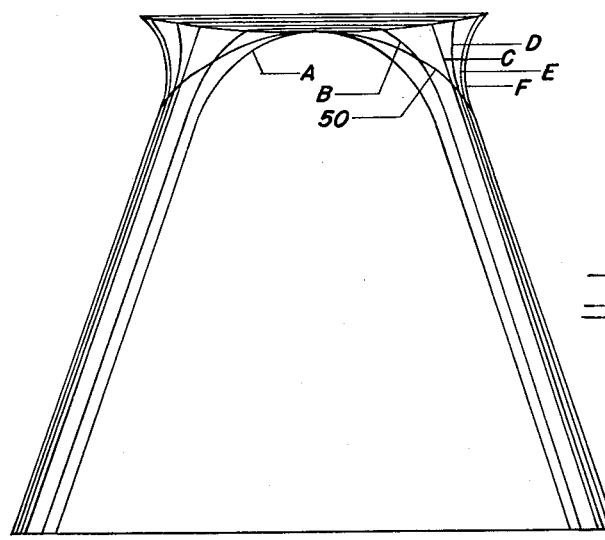
FIG. 5 is a composite view of the sections taken in FIG. 4 from A through F.
Figure 6:
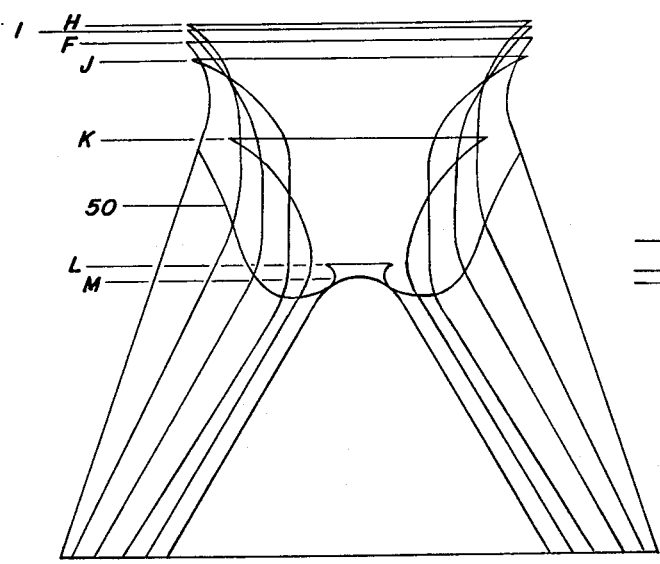
FIG. 6 is a composite view of the sections taken in FIG. 4 from F through M.

Fairing 46 has two sides 52, one of which engages one side of section 44 along the line 50 while the other engages the other side of section 44 in a like manner. Pylon 12 has a rounded forwardly facing surface which tapers or flanges outwardly in a straight line as it extends downwardly to the fuselage 10. The sides of the bottom section 44 of the pylon 12 continue the straight outward taper or flange as they extend rearwardly maintaining substantially the same slope until a point is reached aft of the upright drive shaft. From this point the taper or flange is maintained straight but the slope is decreased until a point is reached near the rearward end. This end is rounded in a manner similar to the forward end (see FIGS. 5 and 6).

The forward portion of each side 52 fairs the cooperating portion of edge 54 of surface 48 into section 44 in a manner providing a smooth projecting surface. This portion of the fairing extends rearwardly to about the line representing section C. From this line the sides 52 start to form a concave surface from the edge of surface 48 to be connected with the remaining portion of the pylon. This concave surface extends to the rearward end of each of the sides 52. Each side 52 has the upper edge of its concave portion meeting the edge of surface 48 and forms an acute angle therewith. Each edge formed by the meeting edges of each side of surface 48 and the upper edge of the cooperating concave portion of a side 52 is well defined and relatively sharp. Each side 52 provides with section 44 a smooth faired entrance surface to the concave portion of side 52 between edge 58 and line 50 from line Q to point R.

Forward motion of the helicopter results in the generation of a vortex passing from each concave side to the top of the pylon. Each side is a pump which pumps high energy air into the wake of the rotor head. Air enters the pump along the smooth faired entrance and is pumped onto the upper surface 48.

It is to be understood that the invention is not limited to the specific embodiment herein illustrated and described, but may be used in other ways without departure from its spirit as defined in the following claims.

I claim:

1. In a vertical rising aircraft, a body, a shaft extending from said body, a rotor mounted on said shaft, and a streamline shaped member extending from said body on the same side as said rotor, said member having a major surface, said surface being between the side of said rotor facing the body and said body, said shaft extending away from said surface, said surface terminating in lateral edges, said member having a concave side which extends away from each lateral edge of said major surface towards said body.

2. In an aircraft having a lifting rotor above a body, a pylon on said body beneath said rotor, means mounting said rotor for rotation, said pylon having an upwardly facing surface over a substantial portion of its length, said surface having a lateral edge on each side of said pylon, said surface being of greater cross-sectional width than the cross-sectional width of said pylon for a distance directly beneath said surface, said surface extending rearwardly of said rotor.

3. In an aircraft having a lifting rotor above a body, a pylon on said body beneath said rotor, a shaft extending away from said pylon for mounting said rotor, said pylon having an upwardly facing surface with generally parallel edges over a substantial portion of its length, said upwardly facing surface being of greater cross-sectional width between said parallel edges than the cross-sectional width of said pylon for a distance directly beneath said surface.

4. In a vertical rising aircraft, a body, a shaft extending from said body, a rotor mounted on said shaft, and a streamline shaped member extending from said body on the same side as said rotor, said member having a major surface, said surface having a flat portion between the side of said rotor facing the body and said body, said shaft extending above said surface, said surface having a curved portion at its rearward end extending inwardly towards the body, said surface terminating in lateral edges, said member having a concave side which extends away from each lateral edge of said major surface towards said body.

5. In a vertical rising aircraft, a body, a shaft extending from said body, a rotor mounted on said shaft, and a streamline shaped member extending from said body on the same side as said rotor, said member having a major surface, said surface having a flat portion between the side of said rotor facing the body and said body, said shaft extending above said surface, said surface having a curved portion at its rearward end extending inwardly towards the body, said surface terminating in lateral edges, said member having a concave side which extends away from each lateral edge of said major surface towards said body, each lateral edge of said major surface forming a well defined edge.

6. In a vertical rising aircraft, a body, a shaft extending from said body, a rotor mounted on said shaft, and a streamline shaped member extending from said body on the same side as said rotor, said member having a major surface, said surface having a flat portion between the side of said rotor facing the body and said body, said shaft extending above said surface, said surface having a curved portion at its rearward end extending towards the body, said surface terminating in lateral edges, said member having a concave side which extends away from each lateral edge of said major surface towards said body, said curved portion of said surface having its lateral edges tapered inwardly toward its rearward end.

7. In a vertical rising aircraft, a body, a shaft extending from said body, a rotor mounted on said shaft, and a streamline shaped member extending from said body on the same side as said rotor, said member having a major surface, said surface having a flat portion between the side of said rotor facing the body and said body, said shaft extending above said surface, said surface having a curved portion at its rearward end extending inwardly towards the body, said surface terminating in lateral edges, said member having a concave side which extends away from each lateral edge of said major surface towards said body, each lateral edge of said major surface forming a well defined edge, said curved portion of said surface having its lateral edges tapered inwardly toward its rearward end.

8. In an aircraft having a lifting rotor above a body, a pylon on said body beneath said rotor, a shaft extending above said pylon for mounting said rotor, said pylon having a flat top surface over a substantial portion of its length, said flat top surface of said pylon being of greater width than the width of said pylon for a distance directly beneath its top surface, said pylon beneath said top surface curving inwardly and downwardly on each side, said flat surface extending rearwardly of said rotor.

9. In an aircraft having a lifting rotor above a body, a pylon on said body beneath said rotor, a shaft extending above said pylon for mounting said rotor, said pylon having a flat top surface with lateral edges over a substantial portion of its length, said flat top surface of said pylon being of greater width than the width of said pylon for a distance directly beneath its top surface, said pylon having a curved surface with lateral edges connected at its forward end to the rearward end of said flat top surface and which extends therefrom towards said body, said pylon beneath said surfaces curving inwardly and downwardly.

10. In an aircraft having a lifting rotor above a body, a pylon on said body beneath said rotor, a shaft extending above said pylon for mounting said rotor, said pylon having a flat top surface with lateral edges over a substantial portion of its length, said flat top surface of said pylon being of greater width than the width of said pylon for a distance directly beneath its top surface, said pylon having a curved surface with lateral edges connected at its forward end to the rearward end of said flat top surface and which extends therefrom towards said body, said pylon beneath said surfaces curving inwardly and downwardly, the lateral edges of said top and curved surfaces presenting a well defined edge.

11. In an aircraft having a lifting rotor above a body comprising a rotor head having rotor blades, said rotor head creating a region of low energy fluid, means for producing a high energy fluid, and means for directing a fluid to said last named means, said producing means directing said high energy fluid into said region to move by its impulse the low energy fluid, said means for producing a high energy fluid comprising a surface below said rotor head having concave sides, each concave side curving inwardly towards the center plane of the aircraft, each concave side curving downwardly along its rearward length towards the body of each aircraft as it extends rearwardly.

12. In an aircraft having a lifting rotor above a body comprising a rotor head having rotor blades, said rotor head creating a region of low energy fluid, means for producing a high energy fluid, and means for directing a fluid to said last named means, said producing means directing said high energy fluid into said region to move by its impulse the low energy fluid, said means for producing a high energy fluid comprising a surface adjacent said rotor head having a concave side on each side of the aircraft, each concave side curving inwardly towards the center plane of the aircraft, each concave side curving downwardly along its rearward length towards the body of said aircraft as it extends rearwardly, each concave side as it extends rearwardly curves inwardly to a line which tapers inwardly towards said center plane of said aircraft.

13. In an aircraft having a lifting rotor, a body, a pylon on said body beneath said rotor, a shaft extending from said pylon for mounting said rotor, said pylon having an upwardly facing surface extending over a substantial portion of its length rearwardly of said shaft, said surface having a lateral edge on each side of said pylon, said surface being of greater cross-sectional width than the cross-sectional width of said pylon for a distance directly beneath said surface, said pylon having a curved surface at its rearward end extending inwardly towards the body from said surface, said surface extending rearwardly of said rotor.

14. In an aircraft having a lifting rotor above a body, a pylon on said body beneath said rotor, a shaft extending from said pylon for mounting said rotor, said pylon having a surface with generally parallel edges over a substantial portion of its length, said surface being of greater cross-sectional width between said parallel edges than the cross-sectional width of said pylon for a distance directly beneath its surface, said surface having a curved portion at its rearward end extending inwardly towards the body.

15. In an aircraft having a body, a rotor on said body comprising a rotor head having rotor blades, said rotor head creating a region of low energy fluid during flight, and means for re-energizing said region of low energy during flight, said re-energizing means comprising a surface with lateral edges below said rotor head having concave sides, each concave side curving inwardly towards the center plane of the aircraft, the top of each concave side curving downwardly along its rearward length towards the body of said aircraft, each lateral edge of said surface curving downwardly along its rearward length with the top of its respective concave side.

16. In an aircraft having a body, a rotor on said body comprising a rotor head having rotor blades, said rotor head creating a region of low energy fluid during flight, and means for re-energizing said region of low energy during flight, said re-energizing means comprising a surface on said body extending behind said rotor head, said surface having lateral edges with concave sides extending downwardly therefrom, each concave side curving inwardly toward the center plane of the body.

17. In a vertical rising aircraft, a fuselage, a rotor head on said fuselage, means for turning said rotor head, and a fairing member fairing said rotor head with said fuselage, said fairing member having an upwardly facing surface extending rearwardly of said rotor head, said surface having lateral edges, said fairing member having concave sides extending downwardly away from said lateral edges of said surface towards the center plane of the body.

18. In a vertical rising aircraft, a fuselage, a rotor head on said fuselage, means for turning said rotor head, and a fairing member fairing said rotor head with said fuselage, said fairing member having an upwardly facing surface extending rearwardly of said rotor head, said surface having a lateral edge on each side of said pylon, said surface extending to said lateral edges being of greater width than the width of said fairing member for a distance directly beneath said surface.

References Cited in the file of this patent
UNITED STATES PATENTS

| | | |
|---|---|---|
| 2,155,426 | Larsen | Apr. 25, 1939 |
| 2,639,874 | Stalker | May 26, 1953 |

OTHER REFERENCES

Pump Questions and Answers, by Carter and Wright, 1st edition, McGraw-Hill Book Co., 1940 (pg. 1).